(12) United States Patent
Sharma et al.

(10) Patent No.: US 11,493,354 B2
(45) Date of Patent: Nov. 8, 2022

(54) POLICY BASED NAVIGATION CONTROL

(71) Applicant: AT&T Intellectual Property I, L.P., Atlanta, GA (US)

(72) Inventors: Deva-Datta Sharma, San Ramon, CA (US); John Oetting, Zionsville, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 183 days.

(21) Appl. No.: 16/846,883

(22) Filed: Apr. 13, 2020

(65) Prior Publication Data

US 2021/0318133 A1    Oct. 14, 2021

(51) Int. Cl.
*G01C 21/34* (2006.01)
*G08G 1/01* (2006.01)
*G01C 21/36* (2006.01)

(52) U.S. Cl.
CPC ..... *G01C 21/3492* (2013.01); *G01C 21/3676* (2013.01); *G08G 1/0112* (2013.01); *G08G 1/0133* (2013.01)

(58) Field of Classification Search
CPC ............... G08G 1/0112; G08G 1/0133; G02C 21/3492; G02C 21/3676
See application file for complete search history.

(56) References Cited

U.S. PATENT DOCUMENTS

| | | | |
|---|---|---|---|
| 7,849,031 B2 * | 12/2010 | Stehle | G06Q 30/0207 706/21 |
| 8,717,387 B1 | 5/2014 | Brewington | |
| 9,204,257 B1 * | 12/2015 | Mendelson | H04W 4/024 |
| 9,679,487 B1 * | 6/2017 | Hayward | B60K 35/00 |
| 9,792,575 B2 * | 10/2017 | Khasis | G05D 1/0088 |
| 9,805,601 B1 * | 10/2017 | Fields | G08G 1/096844 |
| 9,953,535 B1 * | 4/2018 | Canavor | H04W 4/70 |
| 9,961,507 B1 * | 5/2018 | Mendelson | H04W 4/029 |
| 10,156,848 B1 * | 12/2018 | Konrardy | B60W 30/18163 |
| 10,354,217 B2 * | 7/2019 | Khasis | G05D 1/0088 |
| 10,543,741 B2 * | 1/2020 | Biderman | B60L 15/2009 |
| 10,611,475 B1 | 4/2020 | Durand | |

(Continued)

OTHER PUBLICATIONS

"Digital Map Market worth $29.4 billion by 2024," https://www.marketsandmarkets.com/PressReleases/digital-map.asp, 6 pages.

(Continued)

*Primary Examiner* — Luis A Martinez Borrero
(74) *Attorney, Agent, or Firm* — Amin, Turocy & Watson, LLP

(57) ABSTRACT

The described technology is generally directed towards policy based navigation control. Map inputs including, e.g., information about blocked routes or other map information, can be collected from mobile devices. Policies can be applied to the map inputs in order to generate navigation advisories that synthesize information from multiple map inputs. For example, a size and shape of a route blockage zone can be determined from multiple discrete map inputs. In some embodiments, the techniques disclosed herein can be applied in connection with shared overlay maps to support automated, real-time, cross-platform sharing of map information, including navigation advisories, among digital navigational map users, including but not limited to unmanned ground vehicles.

20 Claims, 9 Drawing Sheets

(56) References Cited

U.S. PATENT DOCUMENTS

| | | | |
|---|---|---|---|
| 10,794,710 | B1 | 10/2020 | Liu et al. |
| 11,042,827 | B2* | 6/2021 | Khasis ................. G08G 1/0145 |
| 2003/0014187 | A1 | 1/2003 | Chun et al. |
| 2005/0099322 | A1* | 5/2005 | Wainfan ................. G08G 1/202 |
| | | | 340/995.13 |
| 2007/0293958 | A1* | 12/2007 | Stehle ............... G06Q 30/0207 |
| | | | 700/89 |
| 2011/0106592 | A1* | 5/2011 | Stehle ............... G06Q 30/0207 |
| | | | 705/14.1 |
| 2011/0208417 | A1* | 8/2011 | Fink ................. G08G 1/096827 |
| | | | 701/532 |
| 2013/0030698 | A1 | 1/2013 | Yamagishi et al. |
| 2014/0149032 | A1 | 5/2014 | Barrett et al. |
| 2014/0244110 | A1* | 8/2014 | Tharaldson ........ G01C 21/3691 |
| | | | 701/99 |
| 2015/0032366 | A1* | 1/2015 | Man ..................... H04W 4/024 |
| | | | 701/414 |
| 2015/0073697 | A1 | 3/2015 | Barrett et al. |
| 2015/0338234 | A1 | 11/2015 | Seastrom et al. |
| 2016/0012723 | A1* | 1/2016 | Biderman ............. G08G 1/052 |
| | | | 701/22 |
| 2017/0098372 | A1* | 4/2017 | Eilertsen ............. G08G 1/0133 |
| 2017/0262790 | A1* | 9/2017 | Khasis ................... G08G 1/012 |
| 2017/0284817 | A1* | 10/2017 | Greenspan ......... G01C 21/3438 |
| 2017/0323249 | A1* | 11/2017 | Khasis ................ G08G 1/0129 |
| 2018/0017401 | A1* | 1/2018 | Fletcher ............. G01C 21/3617 |
| 2019/0004525 | A1* | 1/2019 | Bills ..................... G05D 1/0214 |
| 2019/0325376 | A1* | 10/2019 | Khasis ................. G06Q 10/083 |
| 2019/0332114 | A1 | 10/2019 | Moroniti et al. |
| 2019/0383624 | A1* | 12/2019 | Magzimof ........... H04B 17/373 |
| 2020/0166361 | A1* | 5/2020 | Voznesensky ....... G05D 1/0088 |
| 2020/0372792 | A1* | 11/2020 | Li ........................... G06V 20/59 |
| 2021/0004363 | A1 | 1/2021 | Bailly et al. |
| 2021/0035449 | A1 | 2/2021 | Merfels et al. |
| 2021/0285788 | A1* | 9/2021 | Sharma ................. H04W 4/029 |
| 2021/0312375 | A1* | 10/2021 | Khasis ............... G01C 21/3697 |
| 2021/0354724 | A1* | 11/2021 | Sharma .............. G01C 21/3841 |

OTHER PUBLICATIONS

"Comparison of satellite navigation software," https://en.wikipedia.org/wiki/Comparison_of_satellite_navigation_software, 4 pages.

"Reason maintenance," https://en.wikipedia.org/wiki/Reason_maintenance, 3 pages.

Non-Final Office Action received for U.S. Appl. No. 16/815,333 dated Mar. 25, 2022, 55 pages.

Non-Final Office Action received for U.S. Appl. No. 16/876,430 dated Mar. 28, 2022, 32 pages.

Notice of Allowance received for U.S. Appl. No. 16/876,430 dated Aug. 24, 2022, 33 pages.

Final Office Action received for U.S. Appl. No. 16/815,333 dated Aug. 24, 2022, 68 pages.

* cited by examiner

POLICY BASED NAVIGATION CONTROL

TECHNICAL FIELD

The subject application is related to digital navigational map technologies and wireless communications to interact with digital navigational maps, including fifth generation (5G) and subsequent generation cellular communication systems.

BACKGROUND

Digital navigational maps coupled with mobile device location technologies have revolutionized the way we navigate. Today's mobile devices can wirelessly access digital maps that represent virtually any location in the world. Furthermore, devices can plot current device locations on maps. Users can enter starting points and destinations to calculate navigation routes. Digital navigational maps can also show certain real-time information, such as traffic information and locations of car accidents.

However, further improvements in digital navigational maps remain to be developed. For instance, the business landscape for digital navigational maps is presently limited to a few major providers, such as GOOGLE® and APPLE®. These companies have proprietary digital navigational map systems which do not easily share information across platforms. The ability to share map information directly among map users is also limited and cumbersome. In most use cases, direct sharing of map information requires human involvement, such as the manual specification of a map location to be shared and a set of recipients.

The present difficulty in sharing map information is expected to present difficulties for unmanned ground vehicles (UGV), such as driverless cars and delivery robots, in particular. Proprietary systems can and likely will be developed to allow fleets of UGVs to communicate with one another, and such communications can include map information. However, additional efficiency and control, as well as meaningful public safety and convenience gains, can be realized from automated cross-platform sharing of map information among different fleets of UGVs.

The above-described background relating to digital navigational mapping technology is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
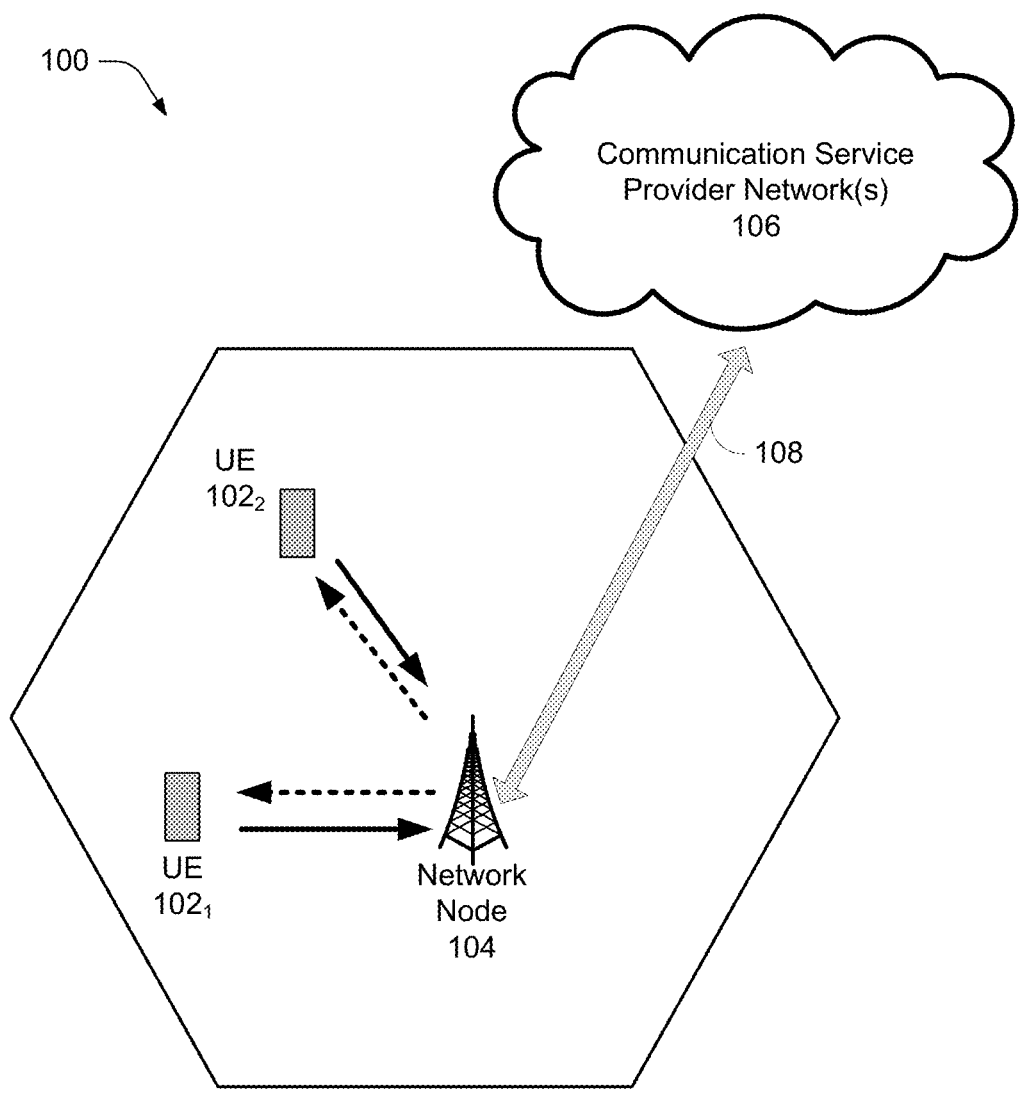
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards policy based navigation control. Map inputs including, e.g., information about blocked routes or other map information, can be collected from mobile devices. Policies can be applied to the map inputs in order to generate navigation advisories that synthesize information from multiple map inputs. For example, a size and shape of a route blockage zone can be determined from multiple discrete map inputs. In some embodiments, the techniques disclosed herein can be applied in connection with shared overlay maps to support automated, real-time, cross-platform sharing of map information, including navigation advisories, among digital navigational map users, including but not limited to unmanned ground vehicles (UGVs).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104, and communication service provider network(s) 106.

In an example embodiment, mobile subscriber devices, such as UGVs, described herein, can be implemented as UEs 102. Alternatively, mobile subscriber devices can access a wireless communication system 100 through UEs 102. A map authority, also described herein, can be implemented as a server within communication service provider network(s) 106. Alternatively, the map authority described herein can be accessible via communication service provider network(s) 106, e.g., the map authority can be implemented as an Internet service accessible via a network connection between communication service provider network(s) 106 and the Internet.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can include a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
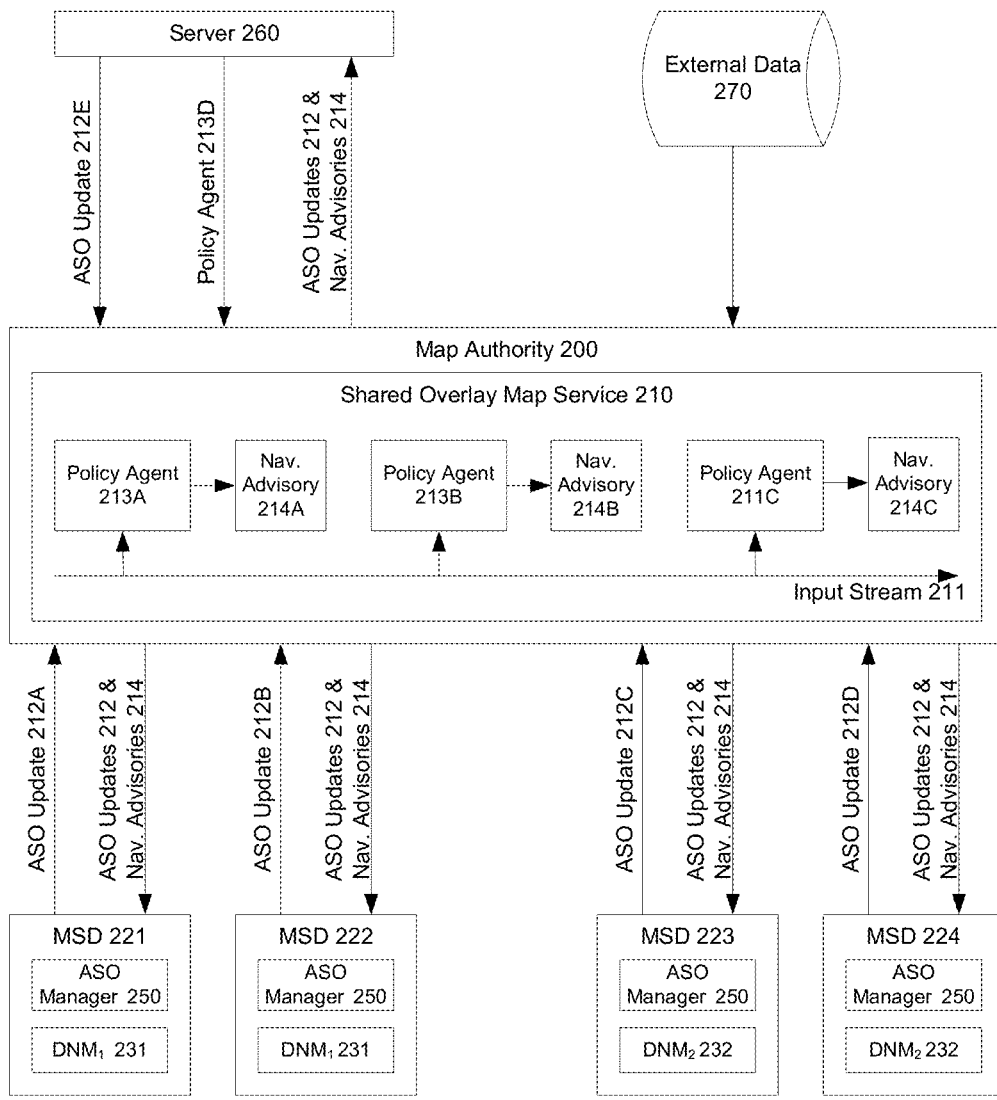
FIG. 2 illustrates an example map authority that hosts a shared overlay map service along with example subscriber devices that use the shared overlay map service, in accordance with various aspects and embodiments of the subject disclosure.

FIG. 2 illustrates an example map authority that hosts a shared overlay map service along with example subscriber devices that use the shared overlay map service, in accordance with various aspects and embodiments of the subject disclosure. FIG. 2 includes a map authority 200 comprising a shared overlay map service 210. The shared overlay map service 210 can include policy agents 213A, 213B, and 213C (referred to collectively as policy agents 213) that can synthesize map inputs received from subscriber devices 221, 222, 223, 224, and 260, generate navigation advisories 214A, 214B, and 214C (referred to collectively as navigation advisories 214), and send the navigation advisories 214 to the subscriber devices 221, 222, 223, 224, and 260. The techniques disclosed herein can employ policy agents 213 in the context of a shared overlay map service 210, however, the shared overlay map service 210 is not necessary for operation of the policy agents 213, and in some embodiments, policy agents 213 can be employed, e.g., in connection with a proprietary digital navigational map service.

Figure 5:
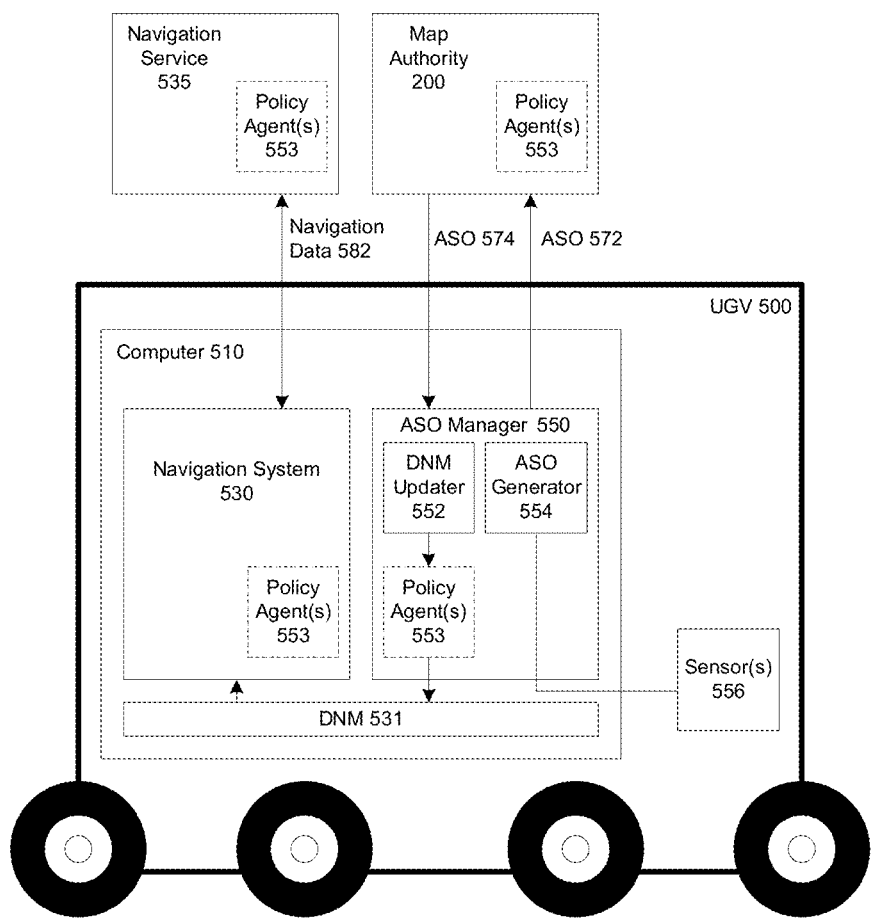
FIG. 5 illustrates an unmanned ground vehicle (UGV), as one example implementation of a mobile subscriber device, in accordance with various aspects and embodiments of the subject disclosure.

The illustrated subscriber devices 221, 222, 223, 224, and 260 include multiple example mobile subscriber devices (MSDs) 221, 222, 223, and 224, and a server 260. The server 260 provides an example subscriber device which is not necessarily mobile. In an embodiment, any of the MSDs 221, 222, 223, and 224 can be in the form of an unmanned ground vehicle (UGV), such as illustrated in FIG. 5, however, in other embodiments, MSDs 221, 222, 223, and 224 can comprise any mobile device equipped to use wireless communications and digital navigational maps. The server 260 can comprise, e.g. a government operated server that controls restricted areas for certain subscriber devices, such as UGVs. Embodiments of this disclosure allow rapid, flexible, and immediately effective deployment of different types of restriction zones to different types of subscriber devices, regardless of which specific navigation systems are employed at the subscriber devices.

In an example embodiment, the MSDs 221, 222, 223, and 224, and the server 260 can communicate with the shared overlay map service 210 via a wireless communication system 100 such as illustrated in FIG. 1. The MSDs 221, 222, 223, and 224, and the server 260 can send and receive map inputs, also referred to herein active/smart overlay (ASO) updates, to and from the shared overlay map service 210. For example, MSD 221 can generate and send an ASO update 212A to the shared overlay map service 210. MSD 222 can generate and send an ASO update 212B to the shared overlay map service 210. MSD 223 can generate and send an ASO update 212C to the shared overlay map service 210. MSD 224 can generate and send an ASO update 212D to the shared overlay map service 210. Server 260 can generate and send an ASO update 212E to the shared overlay map service 210. ASO updates 212A, 212B, 212C, 212D, and 212E are referred to collectively herein as ASO updates 212. The shared overlay map service 210 can send ASO updates 212 to the multiple subscriber devices 221, 222, 223, 224, and 260. ASO updates can also be referred to herein as map overlay information. In general, any of the MSDs 221, 222, 223, and 224, and the server 260 can send ASO updates to the shared overlay map service 210, and the shared overlay map service 210 can promulgate received ASO updates 212 to some or all of the MSDs 221, 222, 223, 224, and the server 260.

The example MSDs 221, 222, 223, and 224 can each comprise a digital navigational map (DNM). In the illustrated example, some of the MSDs, namely, MSDs 221 and 222, comprise a first digital navigational map $DNM_1$ 231, while others of the MSDs, namely, MSDs 223 and 224, comprise a second digital navigational map $DNM_2$ 232. Furthermore, the example MSDs 221, 222, 223, and 224 can each comprise an ASO manager 250.

The ASO managers 250 can be configured to generate and send ASO updates to the shared overlay map service 210. The ASO managers 250 can furthermore be configured to receive ASO updates 212 from the shared overlay map service 210, and the ASO managers 250 can be configured to associate received ASO updates 212 with the DNM, i.e., with either $DNM_1$ 231 or $DNM_2$ 232 depending on which of the DNMs is used by a MSD. The illustrated configuration allows sharing of ASO updates 212 while also permitting individual MSDs to use different DNMs, as well as using different navigation system software or other applications that interact with the different DNMs 231 and 232.

In addition to promulgating ASO updates 212, the shared overlay map service 210 can generate navigation advisories 214 and promulgate the navigation advisories 214 to the subscriber devices 221, 222, 223, 224, and 260. In an example embodiment, ASO updates received at the shared overlay map service 210 can be included in an input stream 211 of map inputs. Each of the policy agents 213 can monitor the input stream 211 in order to identify a group of map inputs within the input stream 211 that satisfies a defined policy. If a group of map inputs is identified by a policy agent, then the policy agent, e.g., policy agent 213A, can use its identified group of map inputs to generate a navigation advisory, e.g., navigation advisory 214A. Similarly, policy agent 213B can use an identified group of map inputs to generate a navigation advisory 214B, and policy agent 213C can use an identified group of map inputs to generate a navigation advisory 214C. Fewer or more policy agents 213 can be included in embodiments of this disclosure, as will be appreciated. Navigation advisories 214 can be sent to subscriber devices 221, 222, 223, 224, and 260 along with any ASO updates 212.

In some embodiments, external data 270 can also be received at map authority 200, and the external data 270 can be used by policy agents 213 in connection with generating navigation advisories 214. In one example, external data 270 can include information about planned events, such as a planned road closure. A policy agent can generate a navigation advisory based on planned event information. The policy agent can optionally refine or update the navigation advisory using information from ASO updates 212.

In an aspect, the shared overlay map service 210 can add, remove, and modify policy agents 213 as desired. For example, a new policy agent 213D can be received from a server 260. The shared overlay map service 210 can add the new policy agent 213D, so that policy agent 213D can begin monitoring the input stream 211 and generating navigation advisories 214 along with the other policy agents 213. While the server 260 in FIG. 2 is also a subscriber device, the server that supplies a new policy agent 213D need not also be a subscriber device.

Figure 3A:
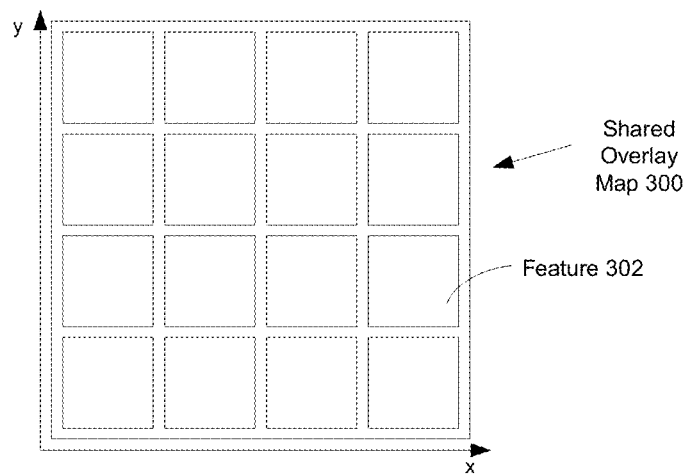
FIG. 3A illustrates an example shared overlay map for use by a shared overlay map service, in accordance with various aspects and embodiments of the subject disclosure.

FIG. 3A illustrates an example shared overlay map for use by a shared overlay map service, in accordance with various aspects and embodiments of the subject disclosure. The example shared overlay map 300 can comprise a coordinate system to define locations within the shared overlay map 300, and features such as example feature 302 with defined locations within the shared overlay map 300.

FIG. 3A includes an example Cartesian (x,y) type coordinate system, however, it will be appreciated that other coordinate systems can be used, such as polar coordinates, spherical coordinates, volumetric (x,y,z) coordinates, etc. In an embodiment, a shared overlay map service such as shared overlay map service 210 illustrated in FIG. 2 can comprise a shared overlay map 300 as a reference map, for use in connection with processing ASO updates 212.

In an example embodiment, the shared overlay map 300 can represent a city, and the illustrated features 302 can represent city blocks and city streets. In another example embodiment, the illustrated shared overlay map 300 can represent an indoor environment, e.g., inside a physical structure, and features 302 can represent, for example, hallways and rooms. The shared overlay map 300 can generally represent any terrain, and features 302 can represent any features.

Figure 3B:
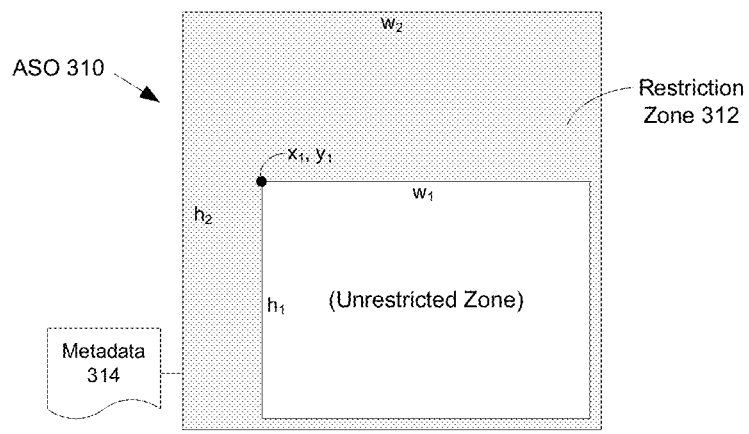
FIG. 3B illustrates an example map overlay that can be applied to the shared overlay map of FIG. 3A, in accordance with various aspects and embodiments of the subject disclosure.
Figure 4:
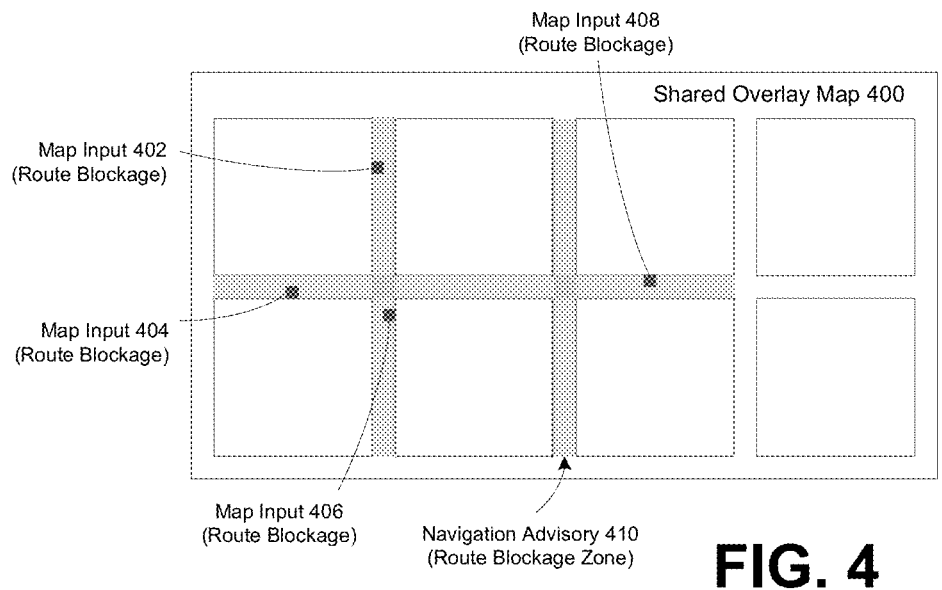
FIG. 4 illustrates an example group of map inputs that satisfies an example defined policy, and a corresponding example navigation advisory, in accordance with various aspects and embodiments of the subject disclosure.
Figure 7:
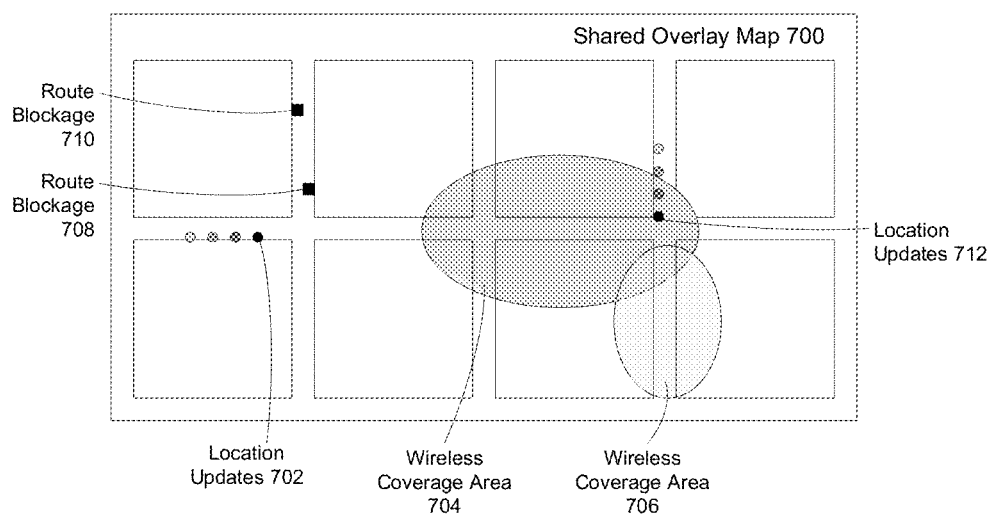
FIG. 7 illustrates an example shared overlay map and additional example map overlays, in accordance with various aspects and embodiments of the subject disclosure.

FIG. 3B illustrates an example map overlay that can be applied to the shared overlay map of FIG. 3A, in accordance with various aspects and embodiments of the subject disclosure. The example map overlay is implemented as ASO 310. The ASO 310 provides an example restriction zone map overlay to indicate a restriction zone 312 where mobile subscriber devices, e.g., MSDs 221, 222, 223, and 224, are not permitted to travel. The ASO 310 is one example of a map overlay, and a wide variety of other map overlays can be generated according to the teachings provided herein. A variety of further example map overlays are illustrated in FIG. 4 and FIG. 7.

In FIG. 3B, the ASO 310 can comprise location information, e.g. the illustrated $x_1$, $y_1$ coordinate. The $x_1$, $y_1$ coordinate can reference, e.g., a coordinate of a location on the shared overlay map 300. The ASO 310 location information thereby includes location information to position the ASO 310 on the shared overlay map 300. Further location information, or else dimension information, such as the illustrated width and height dimensions (w2, h2) of the restriction zone 312 and the illustrated width and height dimensions (w1, h1) of the unrestricted zone, can be used to position further portions of the ASO 310 on the shared overlay map 300.

FIG. 3B furthermore illustrates metadata 314 which can be linked to the ASO 310 in some embodiments. The metadata 314 can optionally include any data desired to accompany the ASO 310. For example, the metadata 314 can comprise a time at which the ASO 310 was generated at a subscriber device, an identification of the subscriber device that generated the ASO 310, a location of the subscriber device at the time the subscriber device generated the ASO 310, and/or a wide variety of other information, such as photos and videos of the location where the ASO 310 was generated and sensor values of any sensors at the subscriber device when the ASO 310 was generated.

Figure 3C:
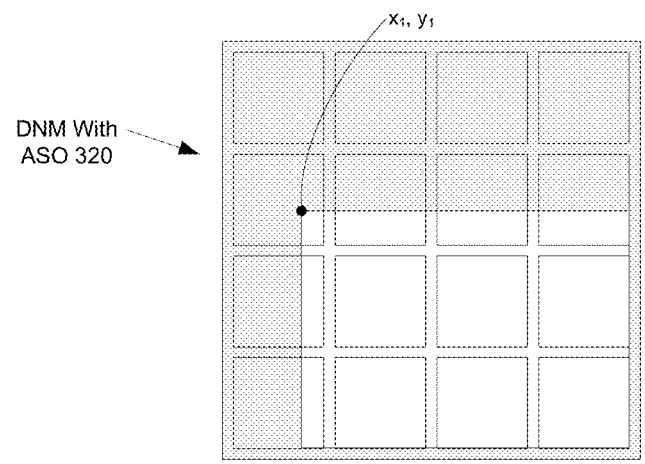
FIG. 3C illustrates an example combination of the map overlay illustrated in FIG. 3B with a digital navigational map at a mobile subscriber device, in accordance with various aspects and embodiments of the subject disclosure.

FIG. 3C illustrates an example combination of the map overlay illustrated in FIG. 3B with a digital navigational map at a mobile subscriber device, in accordance with various aspects and embodiments of the subject disclosure. FIG. 3C illustrates a DNM with ASO 320, wherein the map overlay ASO 310 of FIG. 3B is positioned on a DNM at a subscriber device.

In an example scenario according to FIG. 3C, a first subscriber device can generate the ASO 310 illustrated in FIG. 3B. The first subscriber device can upload the ASO 310 to a map authority comprising a shared overlay map 300 such as illustrated in FIG. 3A. The map authority can then promulgate the ASO 310 to multiple subscriber devices, each of the multiple subscriber devices comprising a DNM. At least one of the multiple subscriber devices can position the received ASO 310 on its DNM, in order to produce a DNM with ASO 320 such as illustrated in FIG. 3C. The coordinate x1, y1 can be translated as necessary, e.g., by an ASO manager 250, to correctly position the received ASO 310 on a subscriber device DNM. The subscriber device comprising the DNM with ASO 320 can then use the DNM with ASO 320 according to its own navigational procedures. For example, the subscriber device can avoid navigating into the restriction zone 312 and instead remain inside the boundaries of the unrestricted zone.

FIG. 4 illustrates an example group of map inputs that satisfies an example defined policy, and a corresponding example navigation advisory, in accordance with various aspects and embodiments of the subject disclosure. FIG. 4 includes a shared overlay map 400. Example map inputs 402, 404, 406, and 408 are placed on the shared overlay map 400. The map inputs 402, 404, 406, and 408 can comprise, e.g., route blockages. An example navigation advisory 410 is also placed on the shared overlay map 400. The navigation advisory 410 is illustrated as a shaded area. The navigation advisory 410 can comprise, e.g., a route blockage zone that is determined based on the map inputs 402, 404, 406, and 408.

In an example according to FIG. 4 and FIG. 2, the map inputs 402, 404, 406, and 408 can be received by a shared map overlay service 210 such as illustrated in FIG. 2. ASO updates such as 212A, 212B, 212C and 212D can comprise map inputs 402, 404, 406, and 408. The MSDs 221, 222, 223, and 224 can comprise, e.g., unmanned ground vehicles. The MSDs 221, 222, 223, and 224 can detect and report route blockages as they travel around a city, and the MSDs 221, 222, 223, and 224 can send ASO updates 212A, 212B, 212C and 212D comprising map inputs 402, 404, 406, and 408 to the shared map overlay service 210 in order to report the detected route blockages.

The shared map overlay service 210 can include the map inputs 402, 404, 406, and 408 in the input stream 211 which is monitored by various policy agents 213. A policy agent, e.g., policy agent 213A, can apply a defined policy which applies to route blockage type map inputs. For example, policy agent 213A can identify groups of map inputs comprising proximal route blockages, where "proximal" can be defined as within a defined distance such as 100 meters. The defined policy can optionally include any defined distance and/or other defined map input parameters as well. In some implementations, defined policies can be created and/or applied by machine learning processes that are trained using historical map inputs and historical corresponding navigation advisories, e.g., historical route blockage map inputs and corresponding historical route blockage zones.

In the example illustrated by FIG. 4, the group of map inputs 402, 404, 406, and 408 can satisfy a defined policy applied by policy agent 213A. The policy agent 213A can identify that the group of map inputs 402, 404, 406, and 408 satisfy its defined policy, and in response to such identification, the policy agent 213A can generate a navigation advisory 214A, comprising navigation advisory 410. The navigation advisory 410 can be configured based on the identified group of map inputs 402, 404, 406, and 408. For example, the map location of the navigation advisory 410 can be based on map locations of the corresponding group of map inputs 402, 404, 406, and 408. Similarly, the shape and size of the navigation advisory 410 can be based on map locations of the corresponding group of map inputs 402, 404, 406, and 408. Other navigation advisory parameters, for example, a navigation advisory duration, can also be based on information included in the group of map inputs 402, 404, 406, and 408.

Having generated a navigation advisory 214A, the shared map overlay service 210 can send the navigation advisory 214A to the subscriber devices 221, 222, 223, 224, and 260, as described in connection with FIG. 2.

FIG. 4 illustrates one example navigation advisory based on one example group of map inputs. The techniques disclosed herein can be applied to generate a wide variety of other navigation advisories based on a wide variety of other map inputs. For example, other route blockage type map inputs can be used to generate navigation advisories having other locations, shapes and sizes.

However, this disclosure is not limited to route blockage map inputs and route blockage zone navigation advisories. Map inputs can comprise any location related information, including ASO updates from mobile subscriber devices, ASO updates from other subscriber devices such as server 260, and any external data 270 such as school locations and schedules, planned event information such as parades and sporting events, calendar and holiday information, time of day and day of week information, information about police and fire responses, and so forth. Policy agents can monitor such a diverse array of map inputs for any pattern of interest, and policy agents can output navigation advisories comprising any navigation related information. For example, a navigation advisory can comprise a restriction zone, such as illustrated in FIG. 3, or a wireless coverage area, such as illustrated in FIG. 7.

FIG. 5 illustrates an unmanned ground vehicle (UGV), as one example implementation of a mobile subscriber device, in accordance with various aspects and embodiments of the subject disclosure. FIG. 5 includes example UGV 500, which can comprise, for example, a computer 510 and various sensors 556 inside a housing that rides on wheels. The computer 510 can communicate with remote devices, such as remote servers that host a navigation service 535 and a map authority 200, via a wireless communication system 100 such as illustrated in FIG. 1. The UGV 500 is one example implementation of an MSD such as MSD 221, introduced in FIG. 2.

FIG. 5 illustrates policy agent(s) 553 at four optional locations, including the map authority 200, the ASO manager 550, the navigation system 553, and the navigation service 553. Depending on the desired configuration, policy agent(s) 553 can optionally be operable at any of the illustrated locations. A first embodiment will be described wherein the policy agent(s) 553 are operable at the map authority 200, for example, policy agent(s) 553 can comprise the policy agents 213 illustrated in FIG. 2. Other alternative embodiments comprising policy agent(s) 553 at other optional locations will be discussed following description of the first embodiment.

In FIG. 5, the example computer 510 can be communicatively coupled with sensor(s) 556, and the computer 510 can comprise a navigation system 530, a DNM 531, and an ASO manager 550. The ASO manager 550 can comprise an ASO generator 554, a DNM updater 552, and optionally, policy agent(s) 553.

In an example operation of UGV 500, a sensor of sensor(s) 556 can detect an input, for example, a route blocking obstruction which prevents UGV 500 from navigating on its calculated route. The sensor 556 can send the input to the ASO generator 554. The ASO generator 554 can generate a map overlay in the form of ASO 572, and the ASO manager 550 can upload the ASO 572 to the map authority 200. The map authority 200 can use policy agent(s) 553 to generate a navigation advisory (such as navigation advisory 214A illustrated in FIG. 2) based on ASO 572 as well as other ASOs received from other subscriber devices. The map authority 200 can generate an ASO 574 comprising the navigation advisory, and the map authority 200 can promulgate the ASO 574 to multiple subscriber devices, such as UGVs. The ASO 574 can be received by UGV 500, that is, the same UGV 500 that originally generated ASO 572, as well as other subscriber devices.

The received ASO 574 comprising a navigation advisory can be processed by DNM updater 552. The DNM updater 552 can update DNM 531 to include the navigation advisory included in the received ASO 574. The navigation system 530 can then use the updated DNM 531, including the navigation advisory, in connection with route calculations for UGV 500. In some embodiments, the navigation system 530 can communicate with navigation service 535, by sending and receiving navigation data 582. Navigation data 582 can optionally include map overlay information such as ASO 574. The navigation service 535 can be configured to recalculate routes for the UGV 500 in view of the received ASO 574, and the navigation service 535 can send recalculated routes and/or other navigation data 582 to the UGV 500.

In an alternative embodiment, UGV 500 can be equipped with limited local processing power, and some or all UGV 500 processing can be done remotely. A remote system, e.g., navigation service 535, can provide any of the UGV 500 processing functions illustrated in FIG. 5, including the communications with the map authority 200, and the navigation service 535 can send navigation commands wirelessly to the UGV 500.

Sensor(s) 556 can optionally include, for example, machine vision sensors, such as cameras, lasers, sonar, radar and/or LIDAR, acoustic sensors such as a microphone, wireless signal sensors such as antennae to measure wireless signal strengths, including cellular radio signals and Wi-Fi, location sensors such as global positioning system (GPS) units, accelerometers, pressure sensors, chemical sensors, biological sensors, or any other sensors.

In some embodiments, a sensor input can be inserted directly into information for a generated ASO 572. For example, ASO generator 554 can include a wireless signal strength measurement, or a detected location of the UGV 500, in an ASO 572, along with shared overlay map 300 location information or other metadata 314. In other embodiments, computer 510 can include software to process sensor inputs to determine appropriate map overlay information to include in an ASO 572. For example, a multifactor analysis, based in part on machine vision sensor inputs and/or other sensor inputs, can be performed at computer 510 to conclude that a route blockage exists which prevents the UGV 500 from traveling an intended route. ASO generator 554 can place a route blockage determination, optionally along with supporting sensor inputs, in an ASO 572 to be sent to the map authority 200.

In an embodiment wherein policy agent(s) 553 are included at ASO manager 550, the ASO 574 need not include a navigation advisory. Instead, the ASO 574 can comprise any map input promulgated by the map authority 200. Policy agent(s) 553 at the UGV 500 can monitor received ASOs, such as ASO 574, to identify groups of ASOs that satisfy defined policies. Policy agent(s) 553 at the UGV 500 can generate navigation advisories locally at the UGV 500.

In embodiments wherein policy agent(s) 553 are included at navigation system 530 and/or navigation service 535, the ASO 574 need not include a navigation advisory. Instead, the ASO 574 can comprise any map input promulgated by the map authority 200. Policy agent(s) 553 at the navigation system 530 and/or navigation service 535 can monitor received ASOs, such as ASO 574, to identify groups of ASOs that satisfy a defined policy. Policy agent(s) 553 at the navigation system 530 and/or navigation service 535 can generate navigation advisories either locally at the UGV 500, or remotely at the navigation service 535.

Figure 6:
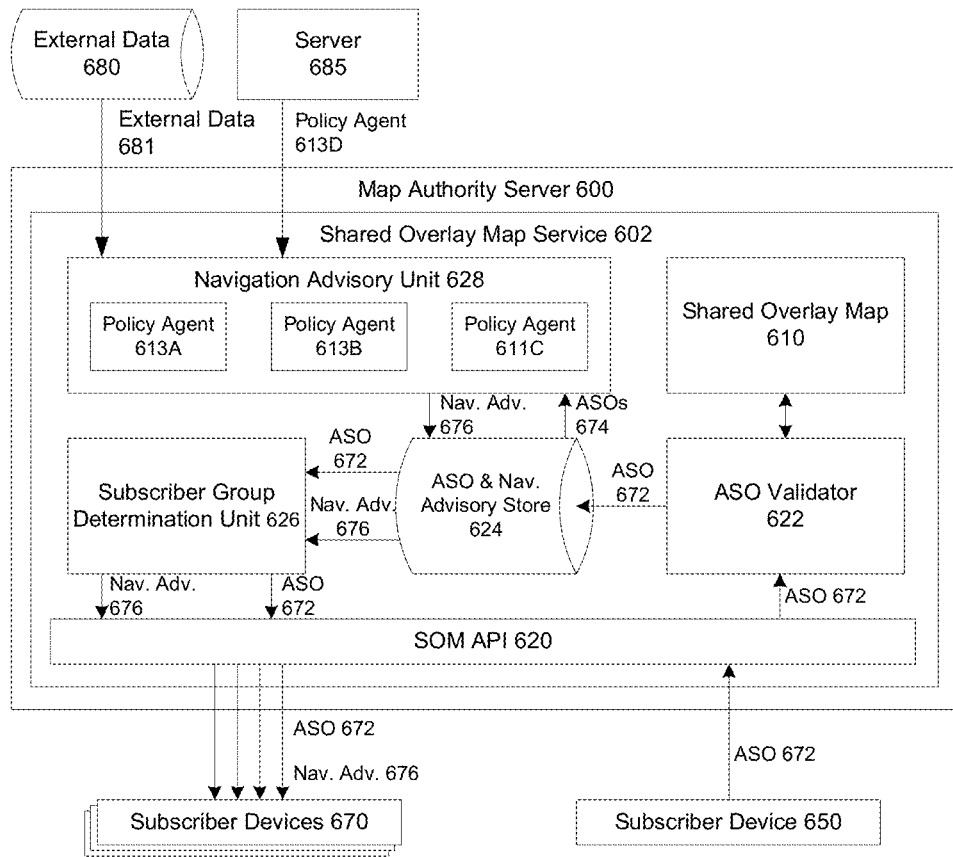
FIG. 6 illustrates an example map authority server, in accordance with various aspects and embodiments of the subject disclosure.

FIG. 6 illustrates an example map authority server, in accordance with various aspects and embodiments of the subject disclosure. The illustrated example map authority server 600 can comprise a shared overlay map service 602. In an embodiment, the map authority server 600 can implement a map authority 200 such as illustrated in FIG. 2, and the shared overlay map service 602 can implement a shared overlay map service 210 such as illustrated in FIG. 2.

The map authority server 600 can communicate with subscriber devices 670 and subscriber device 650 via a wireless communication system 100 such as illustrated in FIG. 1. The subscriber devices 670 and 650 can comprise, e.g., UGVs such as example UGV 500 illustrated in FIG. 5. Otherwise, subscriber devices 670 and 650 can be implemented by any mobile devices, including mobile telephones, tablets, self-driving cars, augmented reality heads up displays, and other mobile devices. In some embodiments, subscriber devices 670 and 650 can also include one or more stationary devices, e.g., a stationary server 260 such as illustrated in FIG. 2.

The example shared overlay map service 602 can include a shared overlay map 610, a shared overlay map (SOM) application programming interface (API) 620, an ASO validator 622, an ASO and navigation advisory store 624, a subscriber group determination unit 626, an a navigation advisory unit 628. The navigation advisory unit 628 can comprise policy agents 613A, 613B, and 613C, referred to collectively as policy agents 613. The policy agents 613 can optionally be updated to include new policy agents, such as new policy agent 613D received from server 685. The shared overlay map 610 can implement a shared overlay map 300 such as illustrated in FIG. 3A. The various other components of the shared overlay map service 602 are described below in connection with example operations of the shared overlay map service 602.

In an example operation sequence, an incoming ASO 672 can be received at SOM API 620 from a subscriber device 650. The SOM API 620 can expose a network API supporting automated accesses to the shared overlay map service 602 by subscriber devices 670 and 650. The SOM API 620 can pass the received ASO 672 to ASO validator 622. The ASO validator 622 can process the ASO 672 to ensure ASO 672 complies with shared overlay map service 602 requirements, for example, timeliness requirements, data structure requirements, data completeness requirements, subscriber device identification requirements, or other requirements as may be appropriate for particular embodiments. The ASO validator 622 can optionally modify the ASO 672. The ASO validator 622 can use the shared overlay map 610 in connection with processing the ASO 672, for example, to refine or otherwise modify location information included in ASO 672, or to check redundancy of ASO 672 with other ASOs in the ASO and navigation advisory store 624. Once the ASO 672 is validated, the ASO validator 622 can store the ASO 672 along with other ASOs in the ASO and navigation advisory store 624.

Incoming ASOs such as ASO 672 can be included in ASOs 674, which can be monitored by the policy agents 613 of the navigation advisory unit 628. In some embodiments, ASOs 674 can comprise a stream of map inputs. In some embodiments, ASOs 674 can comprise any ASOs read by policy agents 613 from the ASO and navigation advisory store 624. The policy agents 613 can analyze ASOs 674 to identify groups of map inputs that satisfy defined policies of each of policy agents 613. The policy agents 613 can also consume external data 681 from any external data source 680 as appropriate.

In response to identification of a group of map inputs and/or external data 681 that satisfies a defined policy, a policy agent can generate a navigation advisory 676 and store the navigation advisory 676 in the ASO and navigation advisory store 624. The navigation advisory 676 can optionally be stored as another ASO and can be promulgated to subscriber devices 670 along with other ASOs, e.g., along with ASO 672.

The subscriber group determination unit 626 can determine a subscriber group, namely, a group of the subscriber devices 670, to receive the navigation advisory 676. In some embodiments, the subscriber devices 670 can be divided into different groups, and a navigation advisory 676 based on ASOs from subscriber devices within a particular subscriber group can be promulgated to the other subscriber devices of the same particular subscriber group. Similarly, the subscriber group determination unit 626 can determine subscriber groups to receive ASOs, e.g., ASO 672.

In other embodiments, the subscriber group determination unit 626 can determine an appropriate group of subscriber devices 670 for each navigation advisory 676 or ASO 672. The group of subscriber devices 670 can be determined based on relevance of the navigation advisory 676 or ASO 672 to the subscriber devices 670. For example, a navigation advisory 676 comprising a UGV restriction zone may be relevant to only UGV type subscriber devices, and so the subscriber group determination unit 626 can send such a restriction zone navigation advisory 676 to only UGV subscriber devices. Subscriber device type and subscriber device navigation advisory or ASO preferences can optionally be gathered by shared overlay map service 602 during a subscriber device enrollment process, and subscriber device information can be provided to subscriber group determination unit 626 for use in determining a group of subscriber devices 670 for each new navigation advisory 676 or ASO 672.

The subscriber group determination unit 626 can pass subscriber device group information to SOM API 620, and the SOM API 620 can send the navigation advisory 676, as well as any ASOs such as ASO 672, to the group of subscriber devices 670. In some embodiments, the SOM API 620 can provide reliable delivery features for delivery of the navigation advisory 676 and ASOs such as ASO 672 to the group of subscriber devices 670.

FIG. 7 illustrates an example shared overlay map and additional example map overlays, in accordance with various aspects and embodiments of the subject disclosure. The shared overlay map 700 can comprise an implementation of the shared overlay map 610 illustrated in FIG. 6, the shared overlay map 400 illustrated in FIG. 4, or the shared overlay map 300 illustrated in FIG. 3. Several example map overlays are illustrated on the shared overlay map 700. The illustrated map overlays can be generated using data from ASOs or navigation advisories described herein. This disclosure provides example map overlays, and further map overlays can be generated with the benefit of this disclosure.

Some map overlays can comprise location updates, such as location updates 702 and location updates 712. In an embodiment, subscriber devices such as UGVs can send ASOs comprising location updates indicating current locations of the subscriber devices. A first UGV can send location updates 702, while a second UGV can send location updates 712. The location updates 702 and 712 can optionally be sent periodically, or else, as a function of UGV displacement since a previous location update. The location updates 702 and 712 are illustrated in FIG. 7 as a time series of updates, with older location updates progressively fading away. In an implementation, a map authority can optionally store location histories of location updates 702 and 712, and can optionally promulgate a limited amount of location history information to subscriber devices, in addition to current subscriber device locations. Location history can be useful for example to allow UGV subscriber devices to determine speed and direction of travel of other UGVs.

Some map overlays can comprise wireless coverage information, such as wireless coverage area 704 and wireless coverage area 706. Wireless coverage areas can potentially overlap, as shown. Navigation advisories described herein can optionally comprise map overlays including wireless coverage information, based on multiple received map inputs. Map inputs comprising wireless coverage information can include, for example, wireless signal identification information and measured wireless signal strength at different locations within the shared overlay map 700. A policy agent can construct a wireless coverage area map overlay based on received wireless coverage measurements. For example, wireless coverage area 704 can comprise a region associated with a first wireless signal, and wireless coverage area 706 can comprise a region associated with a second wireless signal. Alternatively, wireless coverage area 704 can comprise a region of strong wireless signal strength, while wireless coverage area 706 can comprise a region of limited or no wireless signal strength, and the overlap area can be of mixed/medium signal strength. The measured wireless signals can comprise, e.g., cellular radio signals, Wi-Fi signals, or other wireless signals. Some UGVs make heavy, near continuous use of wireless communications, and so wireless coverage information can affect navigation route decisions.

Some map overlays can comprise route blockage information, for example, route blockage 710 and route blockage 708. Route blockage information can comprise an indication that travel is blocked at a location on the shared overlay map 700. Route blockage information can optionally specify a portion of a road or sidewalk and/or a direction of travel which is blocked. Furthermore, route blockage information can comprise any information, such as sensor values, pertaining to the route blockage. For example, a route can be blocked due to long term blockage such as construction, or due to short term blockage such as a safety operation, e.g., a car accident response. As described with reference to FIG. 4, navigation advisories comprising route blockage zones can be constructed based on route blockage map inputs such as route blockage 710 and route blockage 708.

In addition to the example map overlays described herein, some embodiments can be configured to support map overlay annotations. Map overlay annotations can comprise a lightweight annotation to an ASO, to provide some further relevant information for the map overlay. Map overlay annotations can be handled similarly to the map overlays themselves, i.e., generated at a subscriber device, sent to a shared overlay map service, and them promulgated to multiple other subscriber devices.

The map overlays illustrated in FIG. 7 which do not comprise navigation advisories, e.g., the location updates 712, can be generated by mobile subscriber devices, sent to a shared overlay map service, and then promulgated by the shared overlay map service to a plurality of mobile subscriber devices. Map overlays that do comprise navigation advisories, such as, e.g., embodiments of wireless coverage area overlays 704, 706 can be generated at a shared overlay map service based on multiple received map inputs, and then promulgated by the shared overlay map service to a plurality of mobile subscriber devices. Other map overlays, e.g., the restriction zone map overlay illustrated in FIG. 3B, can be generated by a stationary server, such as server 260, sent to a shared overlay map service, and then promulgated by the shared overlay map service to a plurality of mobile subscriber devices.

Figure 8:
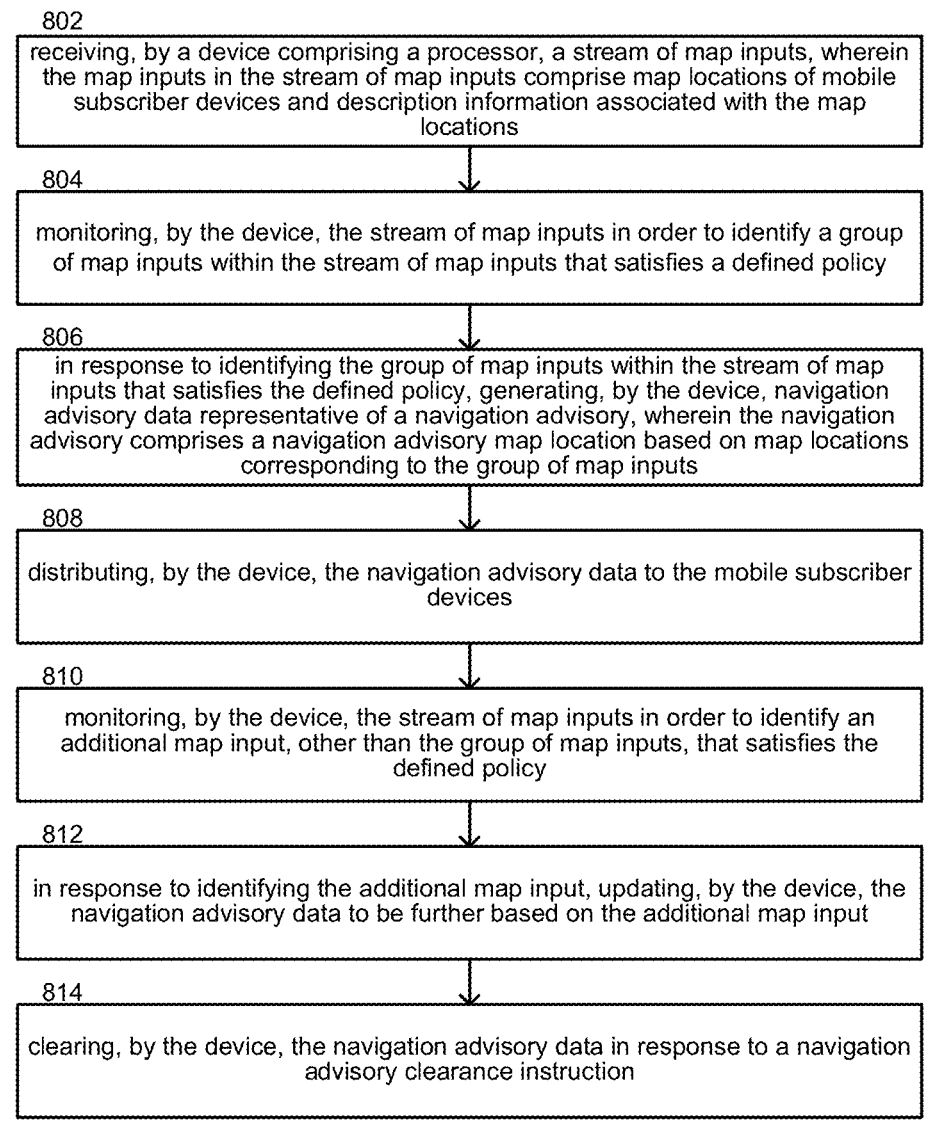
FIG. 8 is a flow diagram representing example operations of a server that generates navigation advisories, in accordance with various aspects and embodiments of the subject disclosure.

FIG. 8 is a flow diagram representing example operations of a server that generates navigation advisories, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a map authority server 600 comprising a shared overlay map service 602, as illustrated in FIG. 6. In some embodiments, the shared overlay map service 602 can comprise an indoor shared overlay map service for a physical structure, such as an office building, a sports arena, or a warehouse, and the mobile subscriber devices 670 and 650 can comprise mobile subscriber devices inside the physical structure. A shared overlay map 610 and map overlays such as ASO 672 can comprise locations and map overlays inside the physical structure. For multistory buildings and buildings with underground spaces such as parking garages and the like, the technologies provided herein can be implemented in three dimensions (3D). An example computing device that can provide the map authority server 600 for an indoor shared overlay map service is a multi-access edge computer (MEC) in a wireless communication system 100 such as illustrated in FIG. 1.

In other embodiments, the shared overlay map service 602 can comprise an outdoor shared overlay map service for an outdoor area such as a city. The mobile subscriber devices 670 and 650 can comprise mobile subscriber devices inside the city. A shared overlay map 610 and map overlays such as ASO 672 can comprise locations and map overlays inside the city. An example computing device that can provide the map authority server 600 for a city shared overlay map service is a RAN intelligent controller (RIC) in a wireless communication system 100 such as illustrated in FIG. 1.

Example operations comprise operation 802, which represents receiving, by a device comprising a processor such as the map authority server 600, a stream of map inputs, e.g., example ASO 672 (received from subscriber device 650) and other ASOs from other subscriber devices, e.g. subscriber devices 670. The mobile subscriber devices 650 and 670 can optionally comprise unmanned ground vehicles. The map inputs such as ASO 672 in the stream of map inputs can comprise map locations of the mobile subscriber devices, and description information associated with the map locations, e.g., route blockage information, wireless signal information, sensor values, etc.

At 804, the map authority server 600 can monitor the stream of map inputs received at block 802 in order to identify a group of map inputs within the stream of map inputs that satisfies a defined policy. For example, each of policy agents 613 can monitor incoming ASOs to identify any ASO groups that satisfy its respective defined policy. The monitoring the stream of map inputs in order to identify the group of map inputs within the stream of map inputs that satisfies the defined policy can be performed by a policy agent 613A of different policy agents 613 at the device 600, and the different policy agents 613 can identify different groups of map inputs within the stream of map inputs.

At 806, in response to identifying the group of map inputs within the stream of map inputs that satisfies the defined policy, the map authority server 600 can generate navigation advisory data representative of a navigation advisory, e.g., navigation advisory 676, wherein the navigation advisory 676 comprises a navigation advisory map location based on map locations corresponding to the group of map inputs. For example, with reference to FIG. 4, the example navigation advisory 610 comprises a navigation advisory map location based on map locations corresponding to the group of map inputs 402, 404, 406, and 408.

As illustrated in FIG. 4, the map inputs 402, 404, 406, and 408 in a stream of map inputs can optionally comprise respective route blockage information, and the navigation advisory data generated at block 806 can comprise route blockage zone data representative of a route blockage zone defined based on the map locations corresponding to the group of map inputs 402, 404, 406, and 408. The techniques described herein can also be used to generate other navigation advisories based on other map input types, as described herein.

In some embodiments, a defined policy can specify map input parameters as well as external data. For example, a defined policy can specify a group of map inputs within the stream of map inputs and an occurrence of a planned event. Identifying the group of map inputs within the stream of map inputs that satisfies the defined policy can be performed during the occurrence of the planned event.

In some embodiments, the navigation advisory data 676 can comprise navigation advisory duration data representative of a navigation advisory duration. As with other properties of a navigation advisory 676, navigation advisory duration data can be based on data in received map inputs. Otherwise, navigation advisory duration data can be based on default durations for different types of navigation advisories. A navigation advisory 676 can expire after the navigation advisory duration. Mobile subscriber devices can discard expired navigation advisories.

At 808, the map authority server 600 can distribute the navigation advisory data 676 to the mobile subscriber devices 670. Subsequent to distributing the navigation advisory data 676 to the mobile subscriber devices 670, the map authority server 600 can perform operations 810, 812, and 814 to update the navigation advisory data 676. At 810, the map authority server 600 can monitor the stream of map inputs in order to identify an additional map input, other than the group of map inputs, that satisfies the defined policy. For example, in the case of a route blockage zone navigation advisory, the map authority server 600 can monitor the stream of map inputs for a route blockage map input that confirms the blockage zone remains blocked. At 812, in response to identifying the additional map input, the map authority server 600 can update the navigation advisory data 676 to be further based on the additional map input. For example, the map authority server 600 can update a navigation advisory duration. At 814, the map authority server 600 can update clear the navigation advisory data 676 in response to a navigation advisory clearance instruction. For example, the map authority server 600 can receive a clearance instruction from a police or fire department device, and the map authority server 600 can distribute an instruction to mobile subscriber devices 670 to delete the navigation advisory data 676.

Figure 9:
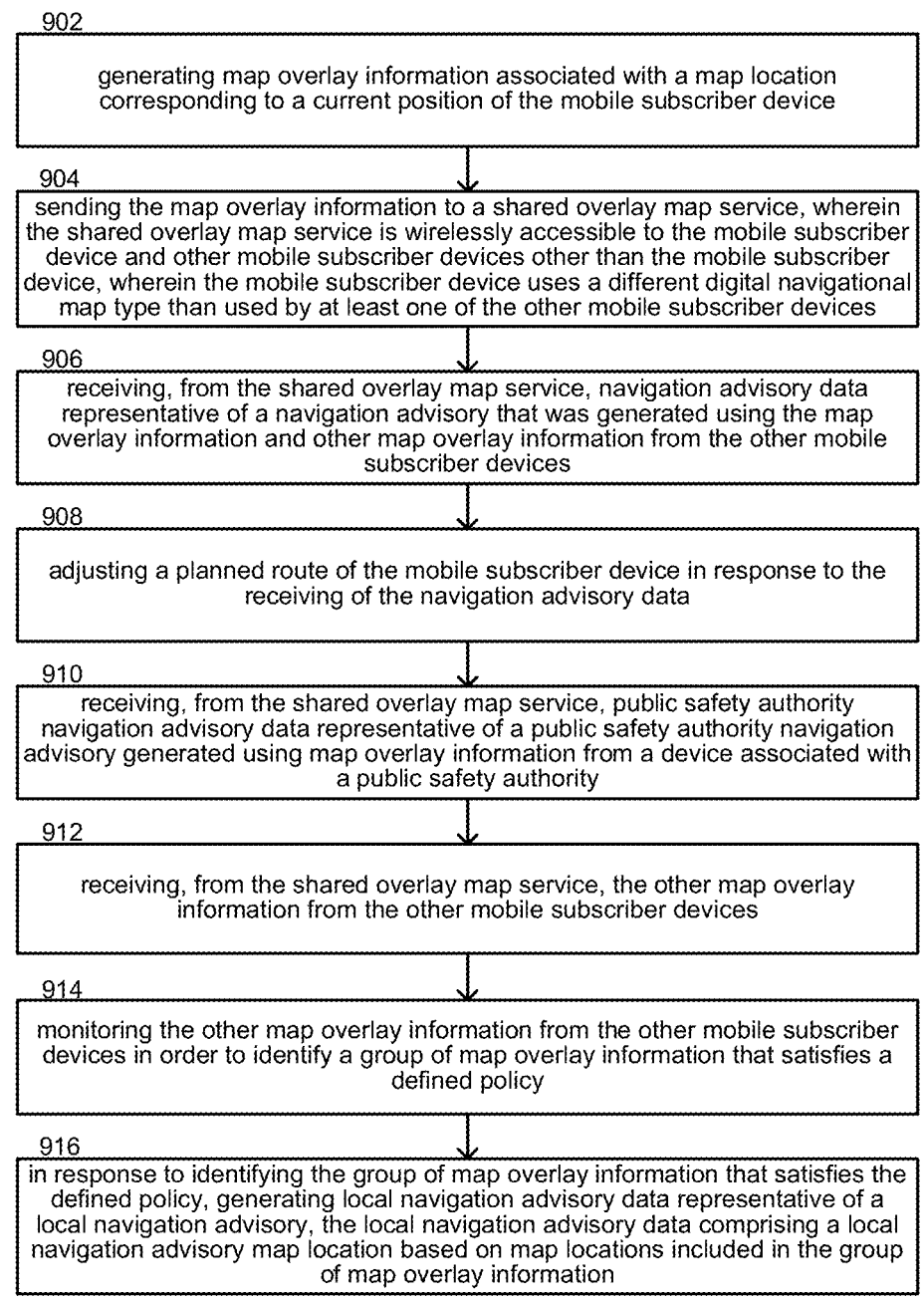
FIG. 9 is a flow diagram representing example operations of subscriber device that supplies a map input to a server and receives a navigation advisory based in part on the map input, in accordance with various aspects and embodiments of the subject disclosure.

FIG. 9 is a flow diagram representing example operations of subscriber device that supplies a map input to a server and receives a navigation advisory based in part on the map input in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a mobile subscriber device such as MSD 221 illustrated in FIG. 2. In some embodiments, the mobile subscriber device 221 can comprises an unmanned ground vehicle such as UGV 500. Example operations comprise operation 902, which represents generating map overlay information, such as ASO update 212A, associated with a map location corresponding to a current position of the mobile subscriber device 221.

At 904, the mobile subscriber device 221 can send the map overlay information 212A to a shared overlay map service 210, wherein the shared overlay map service 210 is wirelessly accessible to the mobile subscriber device 221 and other mobile subscriber devices 222, 223, 224 other than the mobile subscriber device 221, wherein the mobile subscriber device 221 uses a different digital navigational map type ($DNM_1$) than used by at least one of the other mobile subscriber devices (e.g., $DNM_2$).

At 906, the mobile subscriber device 221 can receive, from the shared overlay map service 210, navigation advisory data 214 representative of a navigation advisory that was generated using the map overlay information 212A and other map overlay information 212B, 212C, 212D from the other mobile subscriber devices 222, 223, 224.

At 908, the mobile subscriber device 221 can adjust a planned route of the mobile subscriber device 221 in response to the receiving of the navigation advisory data at block 906. For example, a UGV 500 can recalculate its route to avoid a route blockage zone or an area of low wireless signal coverage.

At 910, the mobile subscriber device 221 can receive, from the shared overlay map service 210, public safety authority navigation advisory data representative of a public safety authority navigation advisory generated using map overlay information from a device associated with a public safety authority. For example, server 260 can comprise a public safety authority server which can supply navigation advisories to shared overlay map service 210. The shared overlay map service 210 can relay public safety authority navigation advisory data to mobile subscriber devices 221, 222, 223, 224, in addition to sending navigation advisories generated by the shared overlay map service 210.

Operations 912-916 relate to generating navigation advisories locally at a subscriber device 221, e.g., at a UGV 500 as described in connection with FIG. 5. At 912, the UGV 500 can receive, from the shared overlay map service 210, other map overlay information from other mobile subscriber devices. For example, UGV 500 can receive map inputs describing route blockages, wherein the map inputs are generated at other UGVs and relayed through the shared overlay map service 210 at map authority 200. At 914, the UGV 500 can monitor the other map overlay information from the other mobile subscriber devices in order to identify a group of map overlay information that satisfies a defined policy. For example, the UGV 500 can use policy agents 553 to monitor map overlay information from the other mobile subscriber devices. At 916, in response to identifying the group of map overlay information that satisfies the defined policy, the UGV 500 can generate local navigation advisory data representative of a local navigation advisory, the local navigation advisory data comprising a local navigation advisory map location based on map locations included in the group of map overlay information. In other words, the UGV 500 can generate a local navigation advisory similar to a navigation advisory that would otherwise be generated at the map authority 200.

Figure 10:
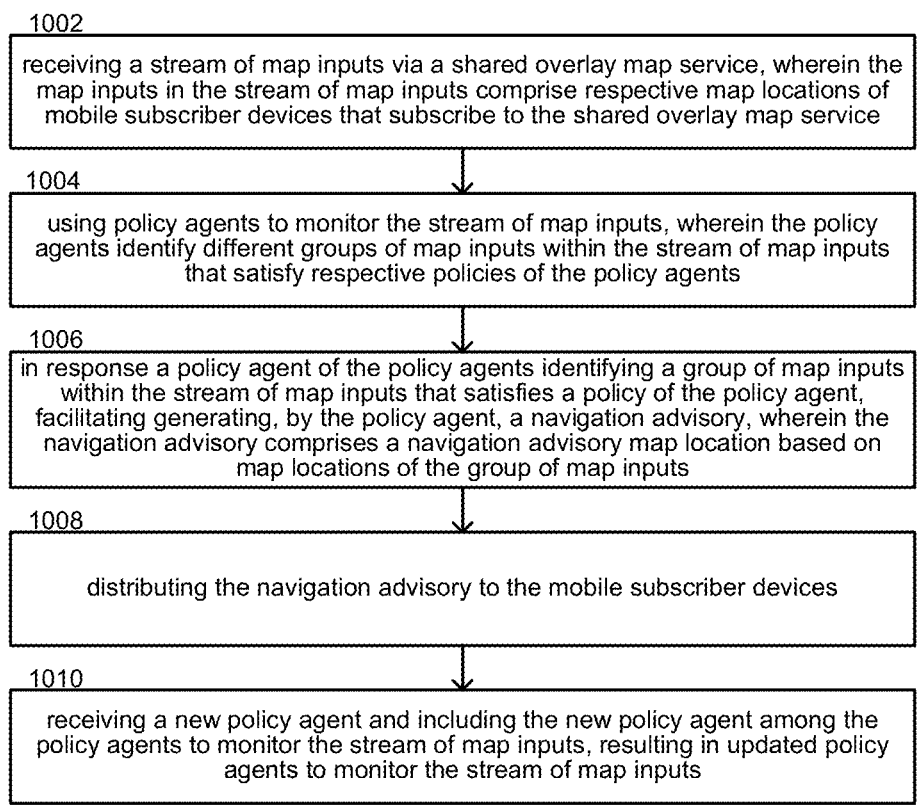
FIG. 10 is a flow diagram representing example operations of a server that uses policy agents to generate navigation advisories, in accordance with various aspects and embodiments of the subject disclosure.

FIG. 10 is a flow diagram representing example operations of a server that uses policy agents to generate navigation advisories, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by a map authority 200 comprising a shared overlay map service 210 such as illustrated in FIG. 2. At operation 1002, the map authority 200 can receive a stream of map inputs 211 via a shared overlay map service 210, wherein the map inputs 212A, 212B, 212C, 212D in the stream of map inputs 211 comprise respective map locations of mobile subscriber devices 221, 222, 223, 224, that subscribe to the shared overlay map service 210.

At 1004, the map authority 200 can use policy agents 213 to monitor the stream of map inputs 211, wherein the policy agents 213 identify different groups of map inputs within the stream of map inputs 211 that satisfy respective policies of the policy agents 213.

At 1006, in response a policy agent, e.g., 213A of the policy agents 213 identifying a group of map inputs, e.g., 212A and 212B, within the stream of map inputs 211 that satisfies a policy of the policy agent 213A, the map authority 200 can facilitate generating, by the policy agent 213A, a navigation advisory 214A, wherein the navigation advisory 214A comprises a navigation advisory map location based on map locations of the group of map inputs 212A and 212B. At 1008, the map authority 200 can distribute the navigation advisory 214A to the mobile subscriber devices 221, 222, 223, 224.

At 1008, the map authority 200 can receive a new policy agent, e.g., 213D, and include the new policy agent 213D among the policy agents 213 to monitor the stream of map inputs 211, resulting in updated policy agents to monitor the stream of map inputs 211.

Figure 11:
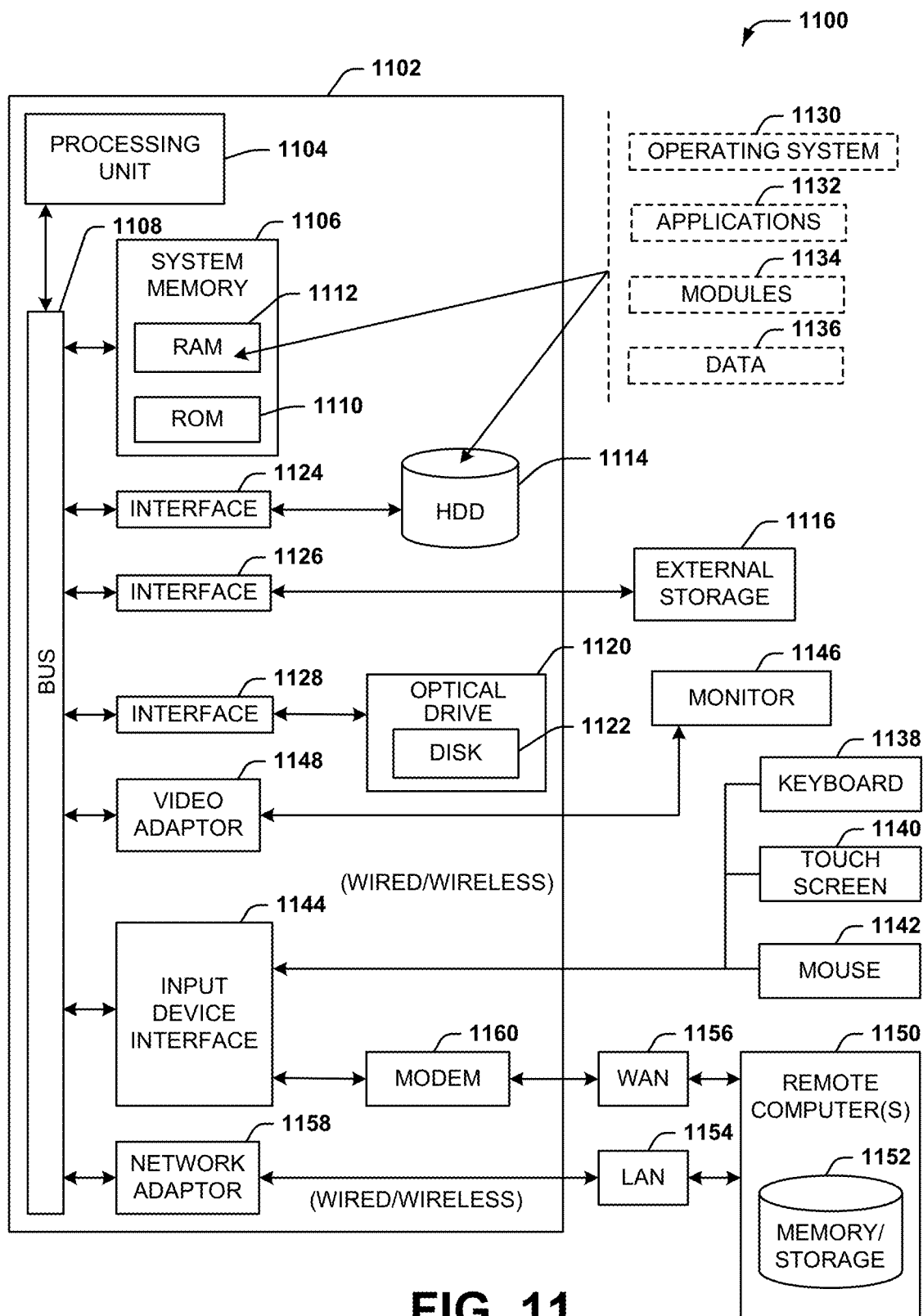
FIG. 11 is a block diagram of an example computer that can be operable to execute processes and methods in accordance with various aspects and embodiments of the subject disclosure.

FIG. 11 is a block diagram of an example computer that can be operable to execute processes and methods in accordance with various aspects and embodiments of the subject disclosure. The example computer can be adapted to implement, for example, a mobile subscriber device 221, a computer 510, a server 260, a map authority server 600, or other computing devices described herein.

FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a device comprising a processor, a stream of map inputs, wherein the map inputs in the stream of map inputs comprise map locations of mobile subscriber devices and description information associated with the map locations;
    monitoring, by the device, the stream of map inputs in order to identify a group of map inputs within the stream of map inputs that satisfies a defined policy, wherein monitoring the stream of map inputs in order to identify the group of map inputs within the stream of map inputs that satisfies the defined policy is performed by a policy agent of different policy agents at the device, and wherein the different policy agents identify different groups of map inputs within the stream of map inputs;
    receiving, by the device, a new policy agent and including, by the device, the new policy agent among the different policy agents to monitor the stream of map inputs, resulting in updated policy agents to monitor the stream of map inputs, wherein the updated policy agents comprise the policy agent;
    in response to identifying, by the policy agent, the group of map inputs within the stream of map inputs that satisfies the defined policy, generating, by the device, navigation advisory data representative of a navigation advisory, wherein the navigation advisory comprises a navigation advisory map location based on map locations corresponding to the group of map inputs; and
    enabling, by the device, re-routing of the mobile subscriber devices, comprising sending, by the device, the navigation advisory to the mobile subscriber devices, wherein the mobile subscriber devices are configured to use the navigation advisory to update route calculations.

2. The method of claim 1, wherein the map inputs in the stream of map inputs comprise respective route blockage information, and wherein the navigation advisory data comprises route blockage zone data representative of a route blockage zone defined based on the map locations corresponding to the group of map inputs.

3. The method of claim 1, wherein the mobile subscriber devices comprise unmanned ground vehicles.

4. The method of claim 1, wherein sending the navigation advisory to the mobile subscriber devices comprises determining, by the device, a group of the mobile subscriber devices, and distributing, by the device, the navigation advisory data to the group of mobile subscriber devices.

5. The method of claim 1, wherein the mobile subscriber devices comprise first mobile subscriber devices equipped with a first digital navigational map type and second mobile subscriber devices equipped with a second digital navigational map type.

6. The method of claim 1, wherein the navigation advisory data comprises navigation advisory duration data representative of a navigation advisory duration, and wherein the navigation advisory expires after the navigation advisory duration.

7. The method of claim 1, further comprising:
    monitoring, by the device, the stream of map inputs in order to identify an additional map input, other than the group of map inputs, that satisfies the defined policy; and in response to identifying the additional map input, updating, by the device, the navigation advisory data to be further based on the additional map input.

8. The method of claim 1, further comprising clearing, by the device, the navigation advisory data in response to a navigation advisory clearance instruction.

9. The method of claim 1, wherein the device comprises an edge server in a cellular communications network.

10. The method of claim 1, wherein the defined policy specifies the group of map inputs within the stream of map inputs and an occurrence of a planned event, and wherein the identifying the group of map inputs within the stream of map inputs that satisfies the defined policy is performed during the occurrence of the planned event.

11. A mobile subscriber device, comprising:
a processor; and
a memory that stores executable instructions that, when executed by the processor, facilitate performance of operations, comprising:
generating map overlay information associated with a map location corresponding to a current position of the mobile subscriber device;
sending the map overlay information to a shared overlay map service, wherein the shared overlay map service is wirelessly accessible to the mobile subscriber device and other mobile subscriber devices other than the mobile subscriber device, wherein the mobile subscriber device uses a different digital navigational map type than used by at least one of the other mobile subscriber devices;
receiving, from the shared overlay map service, navigation advisory data representative of a navigation advisory that was generated using the map overlay information and other map overlay information from the other mobile subscriber devices; and
using the navigation advisory to update a route determination for the mobile subscriber device, resulting in an updated route determination.

12. The mobile subscriber device of claim 11, wherein the mobile subscriber device comprises an unmanned ground vehicle.

13. The mobile subscriber device of claim 11, wherein the operations further comprise adjusting a planned route of the mobile subscriber device according to the updated route determination.

14. The mobile subscriber device of claim 11, wherein the operations further comprise:
receiving, from the shared overlay map service, the other map overlay information from the other mobile subscriber devices;
monitoring the other map overlay information from the other mobile subscriber devices in order to identify a group of map overlay information that satisfies a defined policy; and
in response to identifying the group of map overlay information that satisfies the defined policy, generating local navigation advisory data representative of a local navigation advisory, the local navigation advisory data comprising a local navigation advisory map location based on map locations included in the group of map overlay information.

15. The mobile subscriber device of claim 11, wherein the navigation advisory data comprises a route blockage zone defined by route blockage information included in the map overlay information and the other map overlay information from the other mobile subscriber devices.

16. The mobile subscriber device of claim 11, wherein the operations further comprise receiving, from the shared overlay map service, public safety authority navigation advisory data representative of a public safety authority navigation advisory generated using map overlay information from a device associated with a public safety authority.

17. A non-transitory machine-readable medium, comprising executable instructions that, when executed by a processor, facilitate performance of operations, comprising:
receiving a stream of map inputs via a shared overlay map service,
wherein the map inputs in the stream of map inputs comprise respective map locations of mobile subscriber devices that subscribe to the shared overlay map service, and
wherein different mobile subscriber devices of the mobile subscriber devices use different digital navigational map types;
using different policy agents to monitor the stream of map inputs, wherein the different policy agents identify different groups of map inputs within the stream of map inputs that satisfy different respective policies of the different policy agents;
in response a policy agent of the different policy agents identifying a group of map inputs within the stream of map inputs that satisfies a policy of the policy agent, facilitating generating, by the policy agent, a navigation advisory, wherein the navigation advisory comprises a navigation advisory map location based on map locations of the group of map inputs; and
enabling re-routing of the mobile subscriber devices by sending the navigation advisory to the mobile subscriber devices, wherein the mobile subscriber devices are configured to use the navigation advisory to update route calculations.

18. The non-transitory machine-readable medium of claim 17, wherein the operations further comprise receiving a new policy agent and including the new policy agent among the policy agents to monitor the stream of map inputs, resulting in updated policy agents to monitor the stream of map inputs.

19. The non-transitory machine-readable medium of claim 17, wherein sending the navigation advisory to the mobile subscriber devices comprises determining a group of the mobile subscriber devices, and distributing the navigation advisory to the group of mobile subscriber devices.

20. The non-transitory machine-readable medium of claim 17, wherein the group of map inputs comprises route blockage information, and wherein the navigation advisory comprises a route blockage zone defined by the map locations of the group of map inputs.

* * * * *